(12) United States Patent
Yang et al.

(10) Patent No.: US 11,839,847 B2
(45) Date of Patent: Dec. 12, 2023

(54) AIR PURIFIER FILTER

(71) Applicant: 3AC., LTD., Seoul (KR)

(72) Inventors: Hee Tae Yang, Suwon-si (KR); Sun Ho Lee, Suwon-si (KR); Jae Ho Jeon, Hwaseong-si (KR); Mi Ra Kwon, Ansan-si (KR); Yu Min Kim, Hwaseong-si (KR)

(73) Assignee: 3AC., LTD., Seoul (KR)

( * ) Notice: Subject to any disclaimer, the term of this patent is extended or adjusted under 35 U.S.C. 154(b) by 312 days.

(21) Appl. No.: 17/082,638

(22) Filed: Oct. 28, 2020

(65) Prior Publication Data

US 2021/0162328 A1     Jun. 3, 2021

(30) Foreign Application Priority Data

Dec. 2, 2019 (KR) .................. 10-2019-0158394
Sep. 10, 2020 (KR) .................. 10-2020-0116209

(51) Int. Cl.
*B01D 46/10* (2006.01)
*B01D 46/00* (2022.01)
*B01D 46/52* (2006.01)

(52) U.S. Cl.
CPC ......... *B01D 46/10* (2013.01); *B01D 46/0016* (2013.01); *B01D 46/522* (2013.01); *B01D 2275/10* (2013.01)

(58) Field of Classification Search
CPC .. B01D 46/10; B01D 46/0016; B01D 46/522; B01D 2275/10; B01D 46/0036; B01D 46/30; B01D 46/521; B01D 53/02; B01D 53/86; B01D 2253/102; B01D 2255/802; B01D 2258/06; B01D 39/2062; B01D 2239/0407

See application file for complete search history.

(56) References Cited

U.S. PATENT DOCUMENTS

2012/0272829 A1   11/2012   Fox et al.

FOREIGN PATENT DOCUMENTS

| CN | 1895734 A | * | 1/2007 |
|---|---|---|---|
| CN | 1895734 A | | 1/2007 |
| CN | 208320261 U | * | 1/2019 |
| CN | 208320261 U | | 1/2019 |
| JP | 0494717 A | | 3/1992 |
| JP | 2001-029441 A | | 2/2001 |
| JP | 2001-300222 A | | 10/2001 |
| JP | 2002282624 A | | 10/2002 |
| JP | 2004-223482 A | | 8/2004 |
| JP | 2010-520049 A | | 6/2010 |
| JP | 2019-058903 A | | 4/2019 |
| KR | 10-1522199 B1 | | 5/2015 |
| KR | 10-2018-0021180 A | | 2/2018 |

* cited by examiner

*Primary Examiner* — Waqaas Ali
(74) *Attorney, Agent, or Firm* — NKL LAW; Jae Youn Kim

(57) ABSTRACT

An air purifier filter is proposed. The air purifier filter includes: a filter body having an inlet and an outlet therein such that air flows therethrough, and a receiving space having formed therein; a substrate provided in the receiving space of the filter body; and activated carbon attached to a surface of the substrate, wherein the substrate has a three-dimensional corrugated structure.

3 Claims, 4 Drawing Sheets

AIR PURIFIER FILTER

CROSS REFERENCE TO RELATED APPLICATION

The present application claims priority to Korean Patent Application No. 10-2019-0158394, filed Dec. 2, 2019, the entire contents of which is incorporated herein for all purposes by this reference.

BACKGROUND OF THE INVENTION

Field of the Invention

The present disclosure relates generally to an air purifier filter. More particularly, the present disclosure relates to an air purifier filter, wherein a filtering agent for air purification is evenly and easily filled in a filter body, an air flow and a filtration amount are made constant to improve product reliability, and a contact surface between the filtering agent and air to be purified is optimized to improve filtration efficiency of the air purifier filter.

Description of the Related Art

Here, a related art concerning the present disclosure is provided, and the related art does not necessarily mean a known art.

Generally, an air purifier filter is a filter that filters odor components, fine dust, and bacteria (hereinafter, referred to as "foreign matter") in the air, and is configured to have a filtering agent, such as activated carbon and zeolite having excellent adsorption power for foreign matter, filled in a filter core.

As a prior art related to such an air filter, "Air conditioner filter and method of manufacturing the same" is disclosed in Korean Patent No. 10-1522199 (2015 May 15). As illustrated in FIG. 1, the filter according to the prior art includes a filter body 13 which has a structure having honeycomb-shaped compartments, and is configured to cover the front and rear surfaces of the filter body 13 by using covers 14 and 15 having a mesh shape after filling each of the compartments 12 of such a filter body 13 with the activated carbon 16 such that the activated carbon is prevented from escaping from the filter body 13.

However, the filter according to the prior art described above has the structure of the multiple compartments formed in the filter body 13, and the activated carbon 16 is required to be evenly filled in each of the compartments 12. However, in the process of filling the activated carbon in the compartments 12, the amount of the activated carbon 16 filled in each of the compartments 12 may be different.

That is, the activated carbon 16 may be excessively filled in one of the compartments 12, and may be insufficiently filled in another of the compartments 12. Accordingly, the activated carbon 16 may be filled in a different amount in each of the compartments 12 formed in the filter body 13, so an air flow and a filtration amount may be different in each of the compartments, which decreases product reliability. Furthermore, when the activated carbon is excessively filled in the compartments 12, a first cover 14 and a second cover 15 may not adhere to the filter body 13, so the activated carbon 16 may be removed from the compartments 12.

In addition, in the filter of the prior art, the activated carbon is filled in the compartments 12 of the filter body 13, and when the filter body 13 is tilted, the activated carbon 16 is focused in the direction of gravitational action. Accordingly, each gap (space between the activated carbon) in each of the compartments 12 is not uniform and thus air flow is not constant, so foreign matter in the air passing through the compartments 12 cannot be sufficiently filtered.

A filter for gas purification is disclosed in Japanese patent application publication No. 2001-300222. In the Japanese patent application publication, an activated carbon filter that improves deodorization efficiency by adhering granular activated carbon to a nonwoven fabric or net is disclosed. However, in the case of the filter having the activated carbon adhering to the net, 15 sheets of the filter are required to be stacked to each other to have the same effect as a structure in which the activated carbon adheres to nonwoven fabric having a structure in which fibers are entangled. However, stacking multiple nets to which the activated carbon adheres is inefficient and is disadvantageous in pressure loss that determines filter life and efficiency.

A technology related to a photocatalytic deodorization filter is disclosed in Japanese patent application publication No. 2001-029441. In the Japanese patent application publication, the filter allows the efficiency of a photocatalyst to be improved by attaching the pellets of an adsorbent having the photocatalyst to a substrate of a nonwoven fabric or net shape and then applying pleat processing thereto. However, it is understood that deodorization is performed in such a manner that the pellets of the adsorbent are simply attached to or placed in the rear surface of the adsorbent having the photocatalyst to increase an area in which the photocatalyst receives light, and in such a manner that the adsorption capacity of the adsorbent is increased just by filling many pellets of the adsorbent in the rear surface of the adsorbent. Accordingly, the spirit of technology concerning the efficient filling of the filtering agent is not found.

Documents of Related Art (Patent Document 1) Korean Patent No. 10-1522199 (2015 May 15);

(Patent Document 2) Japanese patent application publication No. 2001-300222 (2001 Oct. 30); and (Patent Document 3) Japanese patent application publication No. 2001-029441 (2001 Feb. 6).

SUMMARY OF THE INVENTION

Accordingly, the present disclosure has been made keeping in mind the above problems occurring in the related art, and the present disclosure is intended to propose an air purifier filter, wherein a filtering agent is evenly and easily filled in a filter body, and though the filter body is tilted, the filtering agent is prevented from leaning to a side, thus making an air flow and a filtration amount constant and improving product reliability and filtration efficiency.

In order to achieve the above objectives, according to one aspect of the present disclosure, there is provided an air purifier filter including: a filter body having an inlet and an outlet formed therein in a flowing direction of air, and having a receiving space formed therein; a substrate provided in the receiving space of the filter body; and a filtering agent attached to a surface of the substrate, wherein the substrate to which the filtering agent is attached has a three-dimensional corrugated structure, and when $V_K$ value is set to a ratio of a surface area of the substrate when the substrate has the corrugated structure to a surface area of the substrate when the substrate has a flat surface, the $V_K$ value calculated in Equation 1 below is 6 to 36:

$$V_K = \frac{y'}{y} \times \frac{1}{h} \times 100 \quad \text{[Equation 1]}$$

(In Equation 1, y is length of the folding direction of a substrate on the assumption that the substrate has a flat surface; y' is length of folding direction of a corrugated substrate when the corrugated substrate is unfolded; and h is height of a ridge of the corrugated substrate).

In the embodiment, the corrugated structure may be configured by being corrugated in one direction of width and length directions of the substrate, and the $V_K$ value is 10 to 36.

In the embodiment, the air purifier filter may further include: a cover fixed to each of the inlet and the outlet, and the filtering agent may be at least one selected from activated carbon, zeolite, silica, alumina, manganese, platinum, copper, photocatalyst, and a combination thereof.

In the air purifier filter according to the embodiment, the three-dimensional corrugated structure may be a structure having at least one shape selected from a shape of a regular prism and a shape of a prism having a rounded ridge.

In the embodiment, the cover may have a shape of mesh.

In addition, in the air purifier filter according to the embodiment, the filtering agent may be the activated carbon, and the activated carbon may have any one shape or at least two shapes selected from spherical, columnar, crushed, and powdered shapes.

According to another aspect of the present disclosure, there is proposed an air purifier filter having the activated carbon filter.

According to the air purifier filter of the present disclosure, mesh is received in the filter body with the activated carbon attached to the mesh and thus the activated carbon can be evenly and easily filled in the filter body, and although the filter body is tilted, the activated carbon is prevented from leaning to a side, thereby making an air flow and a filtration amount constant, and the three-dimensional corrugated structure of the substrate is optimized, thereby improving the filtration efficiency of the air purifier filter.

In addition, in the present disclosure, an adhesive is applied to the surface of the mesh, and the activated carbon is sprayed to the surface of the mesh such that the mesh and the activated carbon are formed integrally with each other, thereby simplifying the production process of the activated carbon filter and making the manufacturing thereof rapid.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Prior to describing in detail, it must be understood that terms used in the present specification are only for describing a specific embodiment, and are not intended to limit the scope of the present disclosure, which is limited only by the scope of the appended claims. All technical and scientific terms used in this specification have the same meaning as commonly understood by those skilled in the art unless otherwise stated.

Throughout this specification and claims, unless otherwise stated, the terms "comprise", "comprises", and "comprising" include a mentioned object and step, or a group of objects and steps, and are not used in the sense of excluding another object and step, or another group of objects and steps.

Meanwhile, the embodiment of the present disclosure may be combined with any other embodiments unless there is a clear objection. Particularly, any feature indicated to be preferred or advantageous may be combined with any features other than the feature indicated to be preferred or advantageous.

Hereinafter, the exemplary embodiment of the present disclosure will be described in detail with reference to the accompanying drawings.

Figure 2:
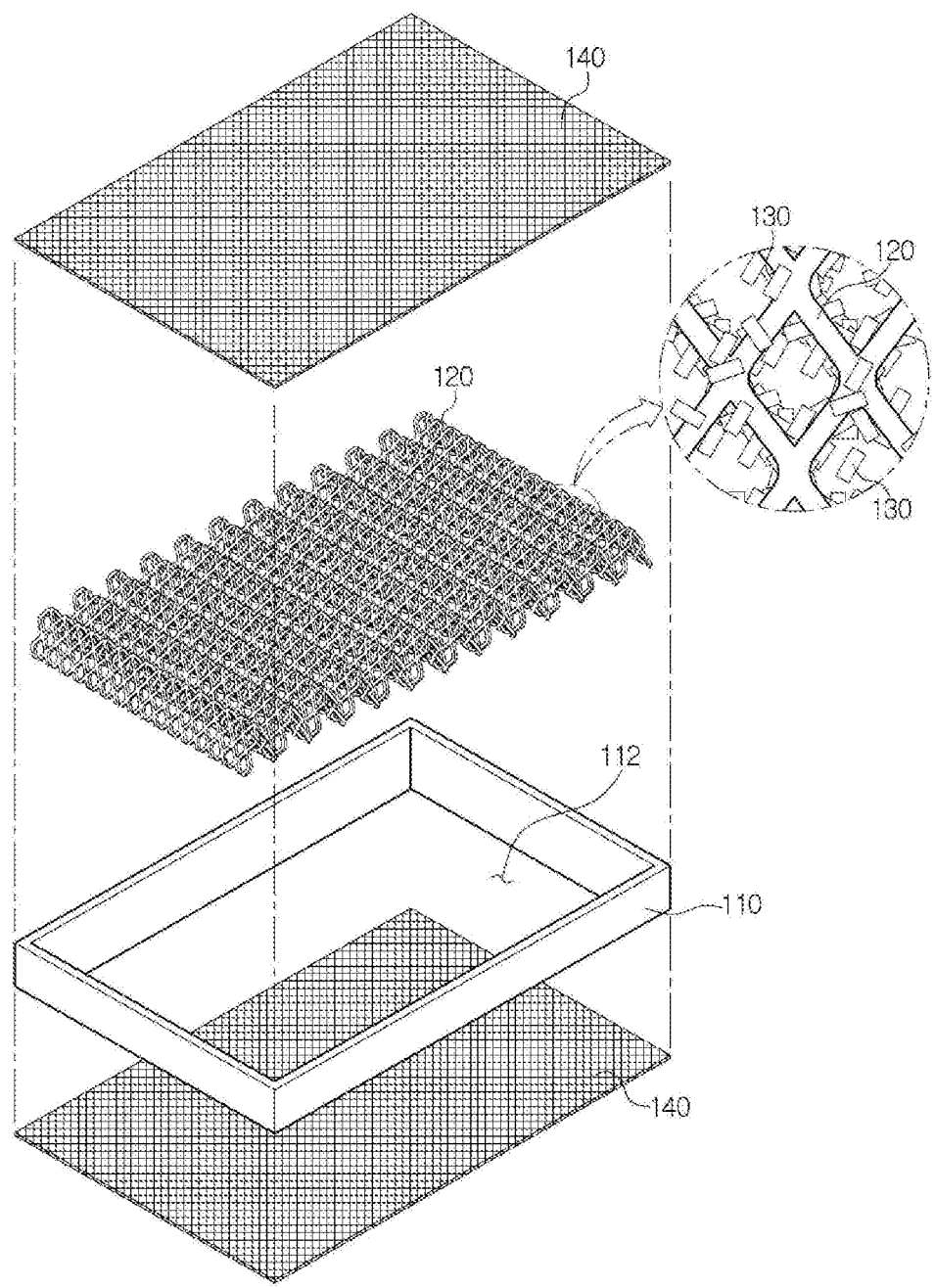
FIG. 2 is an exploded perspective view illustrating an air purifier filter according to an embodiment of the present disclosure.

FIG. 2 is an exploded perspective view illustrating an air purifier filter according to the embodiment of the present disclosure.

Referring to FIG. 2, the air purifier filter according to the embodiment of the present disclosure includes: a filter body 110; a substrate 120 provided in the filter body 110; a filtering agent 130 attached to the surface of the substrate 120; and covers 140 covering an inlet and an outlet of the filter body 110 and having a mesh shape.

Particularly, as illustrated in FIG. 2, the filter body 110 has the shape of a rectangular frame, and has the inlet and the outlet formed on a first side surface thereof and a second side surface thereof, respectively, to allow air to flow therethrough. Furthermore, the filter body 110 has a receiving space 112 defined therein such that multiple substrates 120 may be located in the receiving space.

Such a filter body 110 is not limited to the shape of a rectangular frame and may be variously modified. For example, the filter body 110 may have the shape of a circular, elliptical, or polygonal column, and the shape of the filter body 110 may be modified depending on the shape of a final product such as an air purifier in which a filter is used. The filter body 110 may have the receiving space 112 formed therein such that the substrate 120 to which the filtering agent is attached is located in the receiving space, and may have the inlet and the outlet formed on the first side surface of the filter body 110 and on the second side surface thereof, respectively, so as to allow air to flow therethrough.

The filter body 110 may be made of metal or synthetic resin.

As described above, the substrate 120 to which the filtering agent is attached is provided in the receiving space 112 of the filter body 110. In this case, the substrate 120 may be made of metal or synthetic resin.

The substrate 120 has the shape of a plate having regular or irregular pores continuously formed therein. The substrate 120 is a part constituting the frame of the air purifier filter, with the filtering agent attached to the substrate, and may unrestrictedly use any structure which supports the filter and does not interfere with air passing therethrough. In the embodiment of the present disclosure, the substrate may be mesh having regular pores which are continuously formed therein.

Figure 3:
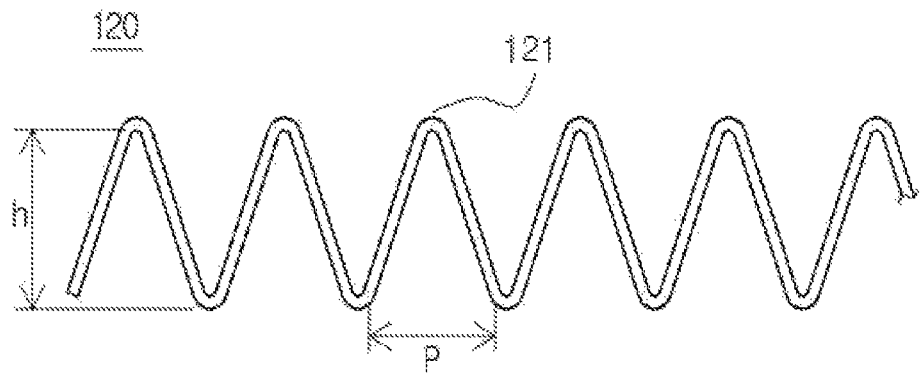
FIG. 3 illustrates a three-dimensional corrugated structure of a substrate according to the embodiment of the present disclosure.

In the embodiment of the present disclosure, the substrate 120 may have a three-dimensional corrugated structure. As illustrated in FIG. 3, the corrugated structure may have the shape of prisms having ridges 121 and pitches p which are regularly formed. The height h of each of the ridges and each of the pitches p may be appropriately embodied according to the size of a filter. However, the corrugated structure preferably has the shapes of isosceles triangles or equilateral triangles in which the sections of the corrugated structure are regularly arranged in terms of achieving optimum filtration efficiency. The regularly arranged isosceles triangles or equilateral triangles mean that isosceles triangles or equilateral triangles with a base of each thereof having a predetermined pitch p are continuously arranged. In the section of the corrugated structure illustrated in FIG. 3, it is preferable that the length of the pitch p of the base of each isosceles triangle is the same, but tolerances may occur in the process of manufacturing the structure. If the length of the pitch is in a 10% tolerance range, the length is considered to be the same as each length of other pitches. Likewise, if a vertex angle which is an angle between the two sides of an isosceles triangle is in a 10% tolerance range, the vertex angle is considered to be the same as each of other vertex angles.

Meanwhile, the range of $V_K$ which is the ratio of a surface area of the substrate extended due to the corrugated structure thereof to a surface area of a substrate having a flat surface, which is located in the receiving space provided in the filter body, may be 6 to 36. Furthermore, the range of $V_K$ may be 10 to 36. $V_K$ is calculated in Equation 1 below.

$$V_K = \frac{y'}{y} \times \frac{1}{h} \times 100 \qquad \text{[Equation 1]}$$

(In Equation 1, y is length of the folding direction of a substrate on the assumption that the substrate has a flat surface; y' is length of folding direction of a corrugated substrate when the corrugated substrate is unfolded; and h is height of a ridge of the corrugated substrate).

More particularly, in the air purifier filter, when activated carbon is used as the filtering agent, attempts to increase deodorizing effect by increasing the amount of the activated carbon have been commonly made. Accordingly, previously, a main task was to maximally fill the filter with the activated carbon. Accordingly, in the prior art, a granular or spherical activated carbon is filled in each compartment having a honeycomb shape, and although the substrate to which the activated carbon is attached has the corrugated structure, the activated carbon is not arranged to be evenly distributed in the corrugated structure, but is arranged to be maximally filled in the empty space of the corrugated structure.

However, surprisingly, the inventor of the present disclosure found that when the substrate to which the filtering agent including the activated carbon is attached is corrugated to have a three-dimensional structure and the surface area of the substrate is effectively increased in the same volume, the amount of the filtering agent required to be filled in a filter is decreased and the filtration efficiency is increased.

When the substrate has the same height as the height of the receiving space and is an isosceles triangle or an equilateral triangle in a section of the substrate, the surface area of the substrate located in the receiving space inside the filter body is increased more than when the substrate located in the receiving space of the filter body is simply a flat surface. Accordingly, as illustrated in FIG. 3, when the corrugated structure has isosceles triangles or equilateral triangles regularly arranged in sections of the corrugated structure, the height of the ridge and the pitch can be controlled to control the surface area of the corrugated structure.

When each height of the corrugated structure is the same and each pitch thereof is short, that is, when the length of the pitch is adjusted to be decreased in the section of the corrugated structure, the surface area of the substrate located in the same receiving space is increased. Accordingly, when the filtering agent is attached to the opposite surfaces of the substrate, the total amount of the filtering agent is increased. According to the prior art, when the total amount of the filtering agent is increased, the deodorization efficiency of the filter was expected to be increased. However, after a long study by the inventor of the present disclosure, it was found that filtration performance is not increased proportionally as the amount of the filtering agent is increased. Additionally, $V_K$ representing the ratio of the surface area of a substrate when the substrate has the corrugated structure to the surface area of a substrate located in the receiving space of the filter body when the substrate has a flat surface is calculated from Equation 1. In Equation 1, y is the length (mm) of the folding direction of the substrate on the assumption that the substrate has a flat surface, and y' is the length (mm) of the folding direction of the corrugated substrate when the corrugated substrate is unfolded. In this case, the length x of uncorrugated direction is the same in the flat substrate and the corrugated substrate. The elements of the $V_K$ described above are units of length and have values corresponding to millimeters (mm), and when $V_K$ is calculated, only values excluding the units of length are substituted.

Likewise, the unit of the height h of the ridge, which is an element determining $V_K$, is also mm, and when $V_K$ is calculated, values excluding the units of mm are substituted, so $V_K$ has a dimensionless value. The h value representing the height of the ridge may be at least 10 mm in terms of achieving targeted filtration efficiency, and 60 mm or less in terms of securing workability. The height h of the ridge of the corrugated substrate depends on the height of the filter body, which determines the volume of the receiving space, and preferably, the height of the filter body and the height of the ridge of the corrugated substrate are the same or have a difference of less than 2 mm therebetween.

Meanwhile, the $V_K$ value is rounded to the first decimal place and represented as an integer. In addition, when $V_K$ value is less than 6, the surface area of the corrugated structure is increased more than the surface area of the flat structure, but it is difficult to secure the amount of the filtering agent capable of optimizing the filtration performance. Furthermore, when the filtering agent is excessively applied to the corrugated structure, pressure loss may be increased and the filtration performance may be decreased, so the deodorization efficiency may be low. When $V_K$ value is more than 36, the total amount of the filtering agent filled in the receiving space of the filter body may be easily increased, but filtration efficiency may be not increased in proportion to the increase of the total amount of the filtering agent. Furthermore, when the pitch is narrow, pressure loss may be increased as the filter is used, and thus the filtration efficiency may be decreased. To have a high deodorization rate and low pressure loss, that is, to optimize the filtration efficiency, $V_K$ value may be 10 or more and 36 or less.

Figure 4:
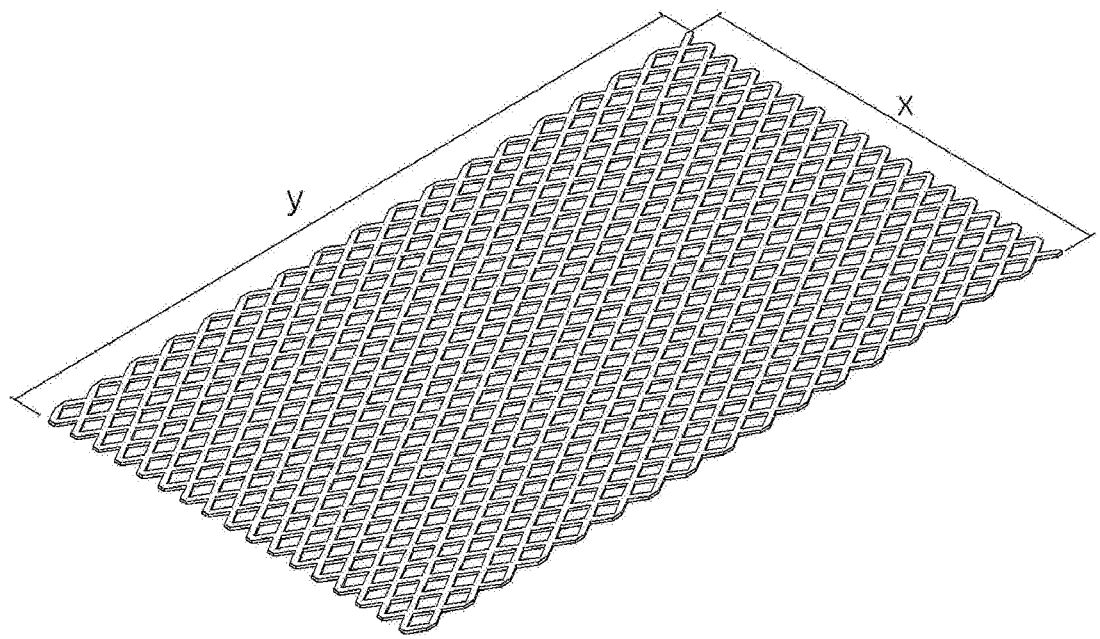
FIG. 4 is a view illustrating the surface area of a substrate when the substrate in the air purifier filter is flat.
Figure 5:
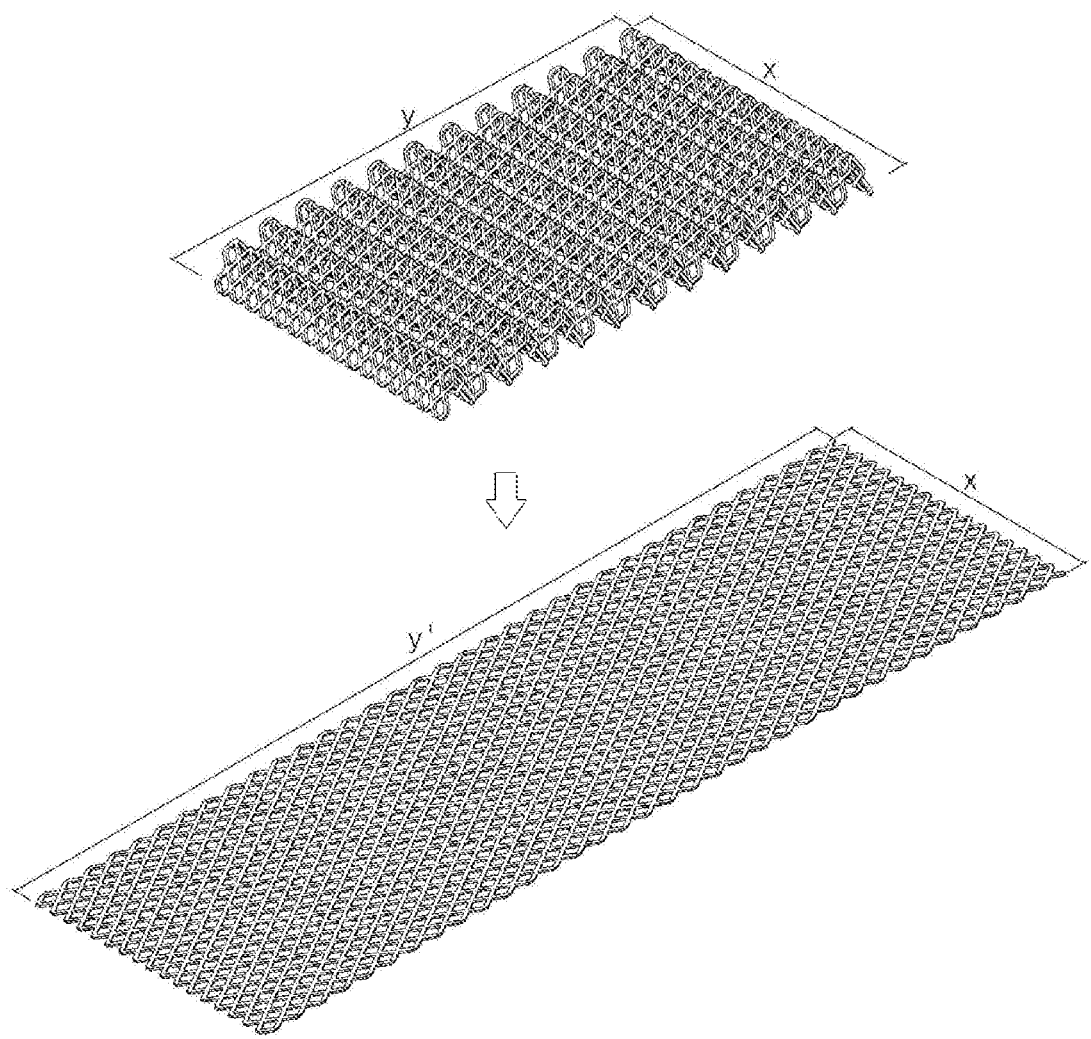
FIG. 5 is a view illustrating the surface area of the substrate when the substrate has the three-dimensional corrugated structure according to the embodiment of the present disclosure.

In the description of the present disclosure, the surface area of the substrate is understood to mean the value of width×height of the surface of the substrate. That is, although the substrate supports the filtering agent, the substrate generally has a structure that allows air to flow therethrough, but the surface area of the substrate does not exclude the structure through which air flows. Furthermore, in the case in which the substrate has the corrugated structure, the surface area increased due to the corrugated structure is the surface area of the substrate. Referring to FIGS. 4 and 5, the surface area of the flat substrate is calculated by multiplying x and y, and the surface area of the corrugated substrate is calculated by multiplying x and y'.

In addition, according to the present disclosure, high filtration efficiency means to be high in a clean air delivery rate (CADR) and low in pressure loss (also referred to as "PL" in short) to have a high deodorization rate for a long time.

Various filtering agents may be used for the filtering agent according to the purpose of a filter. The filtering agent includes an adsorbent that adsorbs odor components and harmful gases in polluted air; a catalyst that decomposes the odor components and harmful gases by inducing a redox reaction; and a combination thereof. Specific examples of the filtering agent include activated carbon, zeolite, silica, alumina, manganese, platinum, copper, a photocatalyst, and the combination thereof.

Referring to FIG. 2, the activated carbon 130 as the filtering agent is attached to the surface of the substrate 120. Air introduced through the inlet of the filter body 110 is purified by the activated carbon 130 attached to the surface of the substrate 120 and is discharged to the outlet.

In the embodiment of the present disclosure, since the substrate 120 has a corrugated shape, the air purifier filter of the present disclosure is higher in filtration efficiency than the activated carbon filter of the prior art that holds the same activated carbon per unit area more than the air purifier filter of the present disclosure.

In the embodiment of the present disclosure, the size or shape of the activated carbon 130 attached to the substrate 120 may be controlled so as to increase filtration efficiency.

The activated carbon is a material which has carbon as a main component thereof and is porous and thus has a large surface area, so the activated carbon has strong adsorption and rapid chemical reaction. The activated carbon is made by drying carbon of wood by using a catalyst such as zinc chloride or phosphoric acid as an activator, or by activating charcoal by using water vapor.

The activated carbon can be classified into crushed, molded, and powdered shapes according to the processing type thereof. The activated carbon having the crushed shape generally has a size of 4-100 mesh, and the shape and size thereof are irregular. The activated carbon having the molded shape is manufactured by adding a binder thereto, and is generally spherical or cylindrical. The activated carbon having the powdered shape is activated carbon powder made by controlling distribution according to the size of particles, and is 100 mesh or less in size. As the activated carbon described in the present disclosure, crushed activated carbon, powdered activated carbon, or a short fiber of an activated carbon fiber may be used with no limitation according to the purpose and use thereof. However, to increase the contact surface area of the activated carbon with air and to secure an attaching area for preventing the activated carbon attached to the substrate from being removed therefrom for increasing the filtration efficiency, a columnar activated carbon may be used in the embodiment of the present disclosure.

As for the substrate 120 to which the activated carbon 130 is attached, for example, while a wound substrate 120 is being moved by a feeding device such as a feeder, the substrate 120 is put in a tank containing an adhesive, and the adhesive is applied to the surface of the substrate 120, and the activated carbon is allowed to be sprayed or fall toward the surface of the substrate 120 passing through the tank, whereby the activated carbon 130 and the substrate 120 can be formed integrally with each other.

In addition, the substrate 120 having the activated carbon 130 attached to the surface thereof can be rapidly manufactured by passing through a dryer for drying the adhesive and a cutting device for cutting the substrate 120 into a predetermined length thereof.

Accordingly, the substrate 120 having the activated carbon 130 attached to the surface thereof is provided in the receiving space of the filter body 110. In this case, each of the inlet and the outlet of the filter body 110 may be covered by the covers 140 to stably fix the substrate 120 provided in the receiving space 112 of the filter body 110 and to prevent the escaping of the activated carbon from the filter body. Each of the covers 140 may unrestrictedly use any structure in which the escaping of the filtering agent is prevented and the introduction and discharge of air is not prevented.

As illustrated in FIG. 2, in the case in which the cover 140 has the shape of mesh, the cover 140 is fixed to the inlet and the outlet along the edges thereof by heat fusion. The cover 140 is made of the same material as the material of the filter body 110, so the cover 140 and the filter body 110 may be integrally fused to each other by heat applied to the edges thereof. Each of the pores of the cover 140 having the shape of mesh is formed to be smaller than the size of the filtering agent attached to the substrate 120, so the filtering agent which may be removed from the substrate 120 is prevented from escaping to the outside of the filter body 110.

As described above, the substrate 120 is provided in the filter body 110 with the filtering agent attached to the substrate 120, and thus the filtering agent can be evenly and easily filled in the filter body 110, and although the filter body 110 is tilted, the filtering agent is prevented from leaning to a side, thereby making an air flow and a filtration amount constant and improving product reliability.

In addition, the mesh to which the filtering agent is attached is embodied to have a corrugated shape, so although the mesh is similar to or lower in the amount of the filtering agent per unit area than a structure having filters having a plate shape stacked to each other, the mesh has improved filtration efficiency.

Furthermore, in the present disclosure, the adhesive is applied to the surface of the substrate 120, and the filtering agent is sprayed to the surface of the substrate such that the substrate 120 and the filtering agent are formed integrally with each other, thereby simplifying the production process of the air purifier filter and making the manufacturing thereof rapid.

Additionally, in the present disclosure, the structure of the corrugated substrate 120 is set to have $V_K$ value calculated in Equation 1, and the filtering agent is attached to the substrate 120, so that pressure loss is low and CADR is high, thereby having excellent filtration efficiency.

In order to experimentally prove difference in the filtration efficiency according to $V_K$ values, the following examples are presented, but the present disclosure is not limited to the following examples.

Example 1

A filter body having the size of 410 mm (width)×270 mm (length)×51 mm (height) and made of synthetic resin (polypropylene) is provided, and a mesh having activated carbon pellets having a columnar shape of Φ2.0×4 mm attached to opposite surfaces thereof is installed in the receiving space of the filter body. The way in which the activated carbon pellets are attached to the mesh is performed in such a manner that the activated carbon pellets are attached to the opposite surfaces of the mesh by allowing the activated carbon pellets to fall toward the mesh while the mesh is being moved with the adhesive applied to the opposite surfaces of the mesh. The mesh is made of aluminum having the thickness of 0.3 mm and has regular pores, and is manufactured to have a size to be mounted in the receiving space of the filter body without wasted space. The mesh is corrugated in the shape of regular prisms, and height h to each ridge thereof from each base thereof is 50 mm, and the length of each pitch p is about 20 mm. Meanwhile, the surface area of the mesh having the corrugated structure is calculated by multiplying width (the length of folding direction) x and unfolded length y' which is equivalent to 268 mm×2039 mm. If the substrate has a flat surface, the length y of a folding direction is 409 mm. The total amount of the activated carbon attached to the substrate is controlled to be about 300 g. The amount of the activated carbon is controlled in consideration of the movement speed of the mesh to which the activated carbon is attached and the falling time of the activated carbon in the manufacturing process.

Examples 2 to 7 and Comparative Examples 1 and 2

A filter body made of synthetic resin (polypropylene) is provided, and a mesh having activated carbon pellets having a columnar shape of Φ2.0×4 mm attached to opposite surfaces thereof is installed in the receiving space of the filter body. The mesh to which the activated carbon pellets are attached is the same as the mesh of example 1. However, the pitch and the height of the ridge of the regular prism shape are changed and the filtration efficiency of the filter according to $V_K$, that is, pressure loss and CADR are measured and checked. The filter body is the same as the filter body of example 1 except for the adjustment of the height of the filter body according to the height of the ridge. Data derived from each of examples and comparative examples are summarized in Table 1 below.

Comparative Example 3—a Honeycomb Filter

Figure 1:
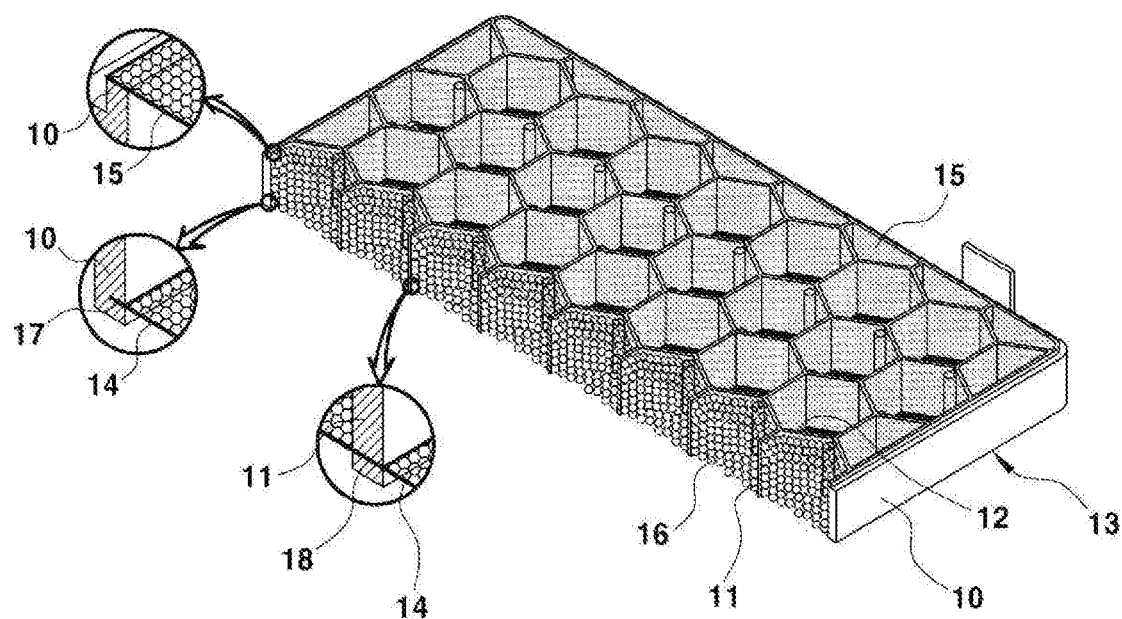
FIG. 1 is a perspective view illustrating a filter according to a prior art.

A filter body having the size of 410 mm (width)×270 mm (length)×15 mm (height) and made of synthetic resin (polypropylene) is provided, and as illustrated in the prior art of FIG. 1, the activated carbon pellets having a columnar shape of Φ2.0×4 mm are filled in the honeycomb compartments located in the receiving space. The amount of the activated carbon filled in the compartments is about 430 g.

Comparative Example 4

A filter body having the size of 410 mm (width)×270 mm (length)×15 mm (height) and made of synthetic resin (polypropylene) is provided, and activated carbon pellets having a columnar shape of Φ2.0×4 mm are attached to the mesh located in the receiving space. The mesh is made of aluminum having the thickness of 0.3 mm and has regular pores, and is manufactured to have a size to be mounted in the receiving space of the filter body without wasted space. The mesh has a flat surface without a corrugated structure. The surface area of the mesh is 268 mm×409 mm, and the total amount of the activated carbon attached to the opposite surfaces of the flat mesh is about 193.8 g.

TABLE 1

| CL | x (mm) | y (mm) | p (mm) | y' (mm) | h (mm) | $V_K$ | ACA(g) | PL (mmH$_2$O) | CADR (m$^3$/hr) |
|---|---|---|---|---|---|---|---|---|---|
| Ex 1 | 268 | 409 | 20 | 2039 | 50 | 10 | 300 | 2.7 | 138 |
| Ex 2 | 268 | 409 | 16 | 1077 | 20 | 13 | 300 | 1.3 | 156 |
| Ex 3 | 268 | 409 | 12 | 2080 | 30 | 17 | 300 | 0.9 | 168 |
| Ex 4 | 268 | 409 | 10 | 1649 | 20 | 20 | 300 | 0.85 | 192 |
| Ex 5 | 268 | 409 | 10 | 3324 | 40 | 20 | 300 | 0.98 | 187 |
| Ex 6 | 268 | 409 | 6 | 4100 | 30 | 33 | 300 | 2.2 | 164 |
| Ex 7 | 268 | 409 | 6 | 1420 | 10 | 35 | 300 | 2.6 | 150 |
| Ex 8 | 268 | 409 | 22 | 1150 | 30 | 9 | 300 | 2.9 | 121 |
| Ex 9 | 268 | 409 | 30 | 872 | 30 | 7 | 300 | 3.5 | 115 |
| Com Ex 1 | 268 | 409 | 5.4 | 6013 | 40 | 37 | 300 | 4.8 | 85 |
| Com Ex 2 | 268 | 409 | 32 | 816 | 40 | 5 | 300 | 5.2 | 72 |
| Com Ex 3 | — | — | — | — | — | — | 430 | 0.82 | 57 |
| Com Ex 4 | 268 | 409 | — | 409 | — | — | 193.8 | 1.77 | 52 |

\* CL: Classification
Ex: Example
Com Ex: Comparative example
ACA: Activated carbon amount
PL: Pressure loss According to the embodiment of the present disclosure, as illustrated in Table 1, when the amount of the activated carbon is the same, it can be seen that there is difference in the filtration efficiency represented by pressure loss and CADR according to the $V_K$. The measurement of each index in Table 1 is performed as follows.

Pressure Loss (PL) and CADR

The pressure loss is used as an index to check the performance of a filter by measuring the pressure of air before and after filtering the air passing through the filter. In this case, the performance of the filter is represented as pressure loss (mmH$_2$O). In the present disclosure, the pressure loss is measured according to the amount of air flowing through the filter under the condition of an air linear velocity of 1 m/s. The experiment was conducted by using a measuring instrument manufactured in accordance with the regulations of AMCA 210 and KS B 6311 as the standard of the measurement of the pressure loss of the air purifier filter.

The measurement of CADR is performed according to SPS-KACA002-132.

Particularly, for the measurement of CADR, each gas of formaldehyde, ammonia, acetaldehyde, acetic acid, and toluene at initial concentration 10 ppm thereof was placed in an 8-Lube chamber, and concentration per minute for each gas was measured and recorded for 20 minutes by using an FT-IR instrument to calculate CADR values.

The CADR of a test object is calculated by the following equation (1).

$$P = \frac{V}{Nt}\left(\ln\frac{C_{i2}}{C_{t2}} - \ln\frac{C_{i1}}{C_{t1}}\right) \quad (1)$$

Here,
P: Purification ability (m$^3$/hr)
V: Test chamber volume (m$^3$)
t: Measurement time (min) during reduction of operation
Ci1: Particle concentration (ppm) at measurement start point t=0 during natural reduction
Ci2: Particle concentration (ppm) at measurement start point t=0 during reduction of operation
Ct1: Particle concentration (ppm) at measurement time t min during natural reduction
Ct2: Particle concentration (p) at measurement time t min during reduction of operation
N: Number of test objects Meanwhile, although the embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An air purifier filter comprising:
a filter body having an inlet and an outlet formed therein in a flowing direction of air, and having a receiving space formed therein;
a flat substrate having a flat surface and provided in the receiving space of the filter body;
a corrugated substrate having a three-dimensional corrugated structure;
a filtering agent attached to a surface of the corrugated substrate; and
a cover fixed to each of the inlet and the outlet,
when $V_K$ value is set to a ratio of a surface area of the corrugated substrate to a surface area of the flat substrate, the $V_K$ value calculated in Equation 1 below is 10 to 36:

$$V_K = \frac{y'}{y} \times \frac{1}{h} \times 100 \qquad \text{[Equation 1]}$$

(wherein in Equation 1, y is a length of the flat substrate in its folding direction; y' is a length of the corrugated substrate in its folding direction when the corrugated substrate is unfolded; and h is a height of a ridge of the corrugated) substrate,
wherein h is 10 mm to 60 mm,
wherein the cover has a shape of mesh,
wherein the three-dimensional corrugated structure has at least one shape selected from a shape of a regular prism and a shape of a prism having a rounded ridge,
wherein the filtering agent is activated carbon, and the activated carbon has any one shape or at least two shapes selected from spherical, columnar, crushed, and powdered shapes, and
wherein the cover includes pores smaller than a size of the filtering agent.

2. The air purifier filter of claim 1, wherein the corrugated structure is configured by being corrugated in one direction of folding and length directions of the corrugated substrate.

3. The air purifier filter of claim 1, wherein the filtering agent further comprises at least one selected from zeolite, silica, alumina, manganese, platinum, copper, photocatalyst, and a combination thereof.

* * * * *